United States Patent
Fuchigami et al.

(10) Patent No.: US 7,982,894 B2
(45) Date of Patent: Jul. 19, 2011

(54) DIGITAL MULTIPLE APPARATUS

(75) Inventors: Takahiro Fuchigami, Yokosuka (JP); Haruhiko Ishida, Tokyo (JP); Masao Yamaguchi, Tokyo (JP); Sunao Tabata, Mishima (JP); Hiroyuki Kato, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1153 days.

(21) Appl. No.: 11/688,546

(22) Filed: Mar. 20, 2007

(65) Prior Publication Data

US 2008/0231882 A1    Sep. 25, 2008

(51) Int. Cl.
*G06F 15/00* (2006.01)
*G06G 15/00* (2006.01)

(52) U.S. Cl. ......................................... 358/1.15; 399/83

(58) Field of Classification Search ................. 358/1.15, 358/1.16, 1.14, 1.18, 3.24, 1.8, 444, 402, 358/462, 474, 1.1; 399/81, 83, 53, 366, 88, 399/60, 61, 1, 8; 400/62; 270/58.14, 58.23, 270/58.02

See application file for complete search history.

(56) References Cited

U.S. PATENT DOCUMENTS 5,287,194 A * 2/1994 Lobiondo ..................... 358/296

FOREIGN PATENT DOCUMENTS

| JP | 10-157251 | 6/1998 |
| JP | 2002-234237 | 8/2002 |
| JP | 2005-18590 | 1/2005 |
| JP | 2005-228143 | 8/2005 |
| KR | 10-2005-0000487 | 1/2005 |

OTHER PUBLICATIONS

Korean Office Action mailed on Nov. 21, 2008 corresponding to U.S. Appl. No. 11/688,546, filed Mar. 20, 2007.

* cited by examiner

*Primary Examiner* — Saeid Ebrahimi Dehkordy
(74) *Attorney, Agent, or Firm* — Turocy & Watson, LLP (57) ABSTRACT

In a digital multiple apparatus, at least two different jobs are processed by at least two job processing units, and while job processing by one job processing unit, if there is an interruption by job processing by the other job processing unit, an end time of the job processing by the one job processing unit is predicted on the basis of job processing time required for the job processing by the other job processing unit.

20 Claims, 4 Drawing Sheets

DIGITAL MULTIPLE APPARATUS

BACKGROUND OF THE INVENTION

1. Field of the Invention

The present invention relates to a digital multiple apparatus having functions of, for example, printing print data and copying.

2. Description of the Related Art

There have been image processing apparatuses that print print data. Techniques related to the image processing apparatus include, for example, JP-A-2005-228143, JP-A-10-157251, and JP-A-2002-234237. JP-A-2005-228143 discloses that a predicted print completion time of a job is displayed on the basis of print capability and print processing time. JP-A-10-157251 discloses that an estimate print time of a new print job is added to total print time of a previous print job, thus updating the total print time. JP-A-2002-234237 discloses that the time required for print data analysis of one copy is measured and an output completion time is predicted in accordance with the result of this measurement.

BRIEF SUMMARY OF THE INVENTION

A digital multiple apparatus according to a principal aspect of the invention includes at least two job processing units configured to process at least two different jobs, and a job end time calculating unit configured, while job processing by one job processing unit of at least two job processing units, if there is an interruption by job processing by the other job processing unit, to predict an end time of the job processing by the one job processing unit on the basis of job processing time required for the job processing by the other job processing unit.

A job end time prediction method for a digital multiple apparatus according to another aspect of the invention includes processing at least two different jobs by at least two job processing units, and while job processing by one job processing unit of the job processing units, if there is an interruption by job processing by the other job processing unit, predicting an end time of the job processing by the one job processing unit on the basis of job processing time required for the job processing by the other job processing unit.

A storage medium storing a job end time prediction program according to still another aspect of the invention includes processing at least two different jobs by at least two job processing units, and while job processing by one job processing unit of the job processing units, if there is an interruption by job processing by the other job processing unit, predicting an end time of the job processing by the one job processing unit on the basis of job processing time required for the job processing by the other job processing unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, a first embodiment of the invention will be described with reference to the drawings.

Figure 1:
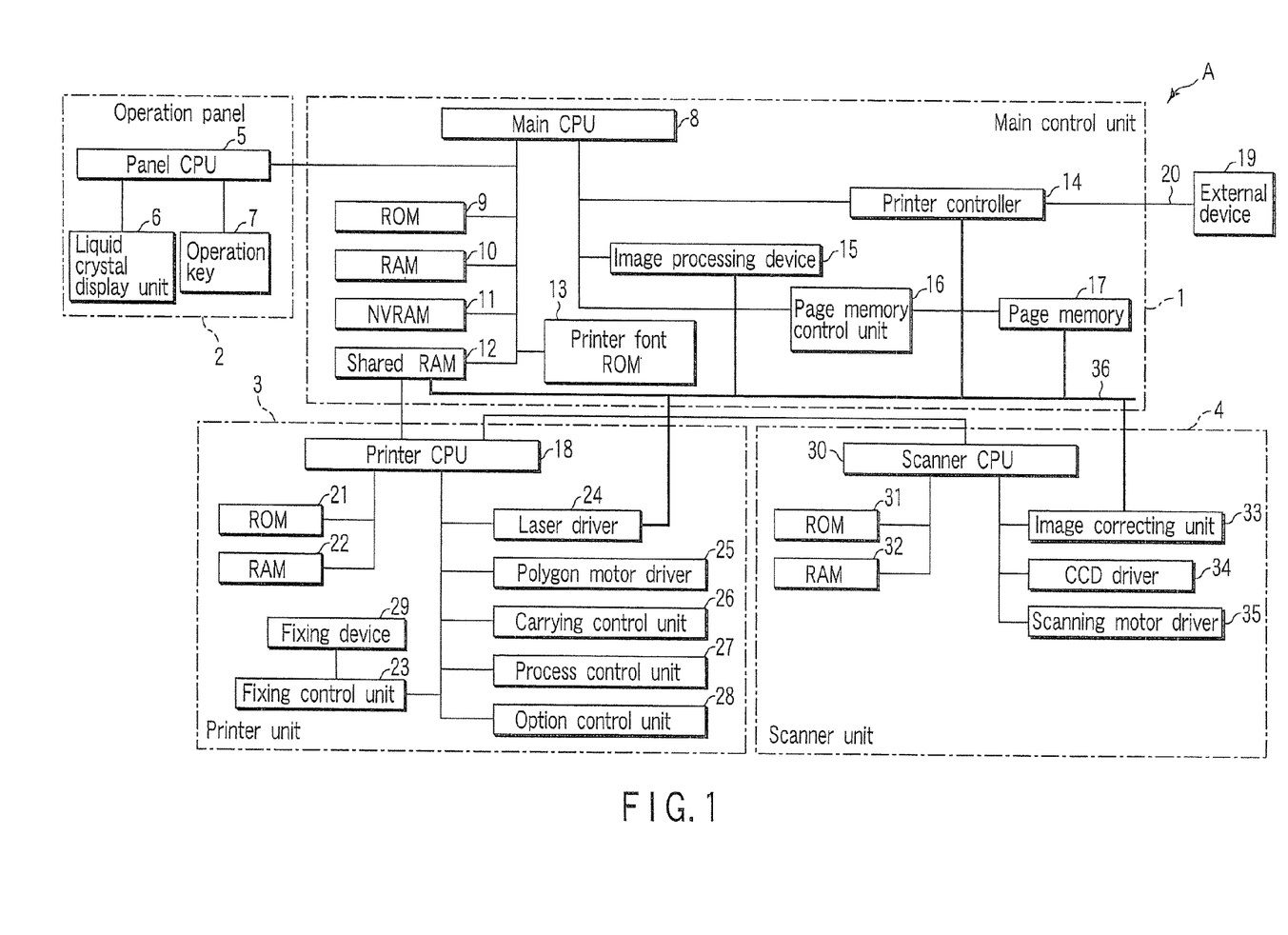
FIG. 1 is a block configuration view showing a first embodiment of a digital multiple apparatus according to the invention.

FIG. 1 shows a functional block configuration view of a digital multiple apparatus. The digital multiple apparatus A has a main control unit 1, an operation panel 2, a printer unit 3, and a scanner unit 4. The main control unit 1 receives operation information from the operation panel 2 and controls the operations of the printer unit 3 and the scanner unit 4.

The operation panel 2 has a panel CPU (central processing unit) 5. A liquid crystal display unit 6 and an operation key 7 are connected to this panel CPU 5. The operation key 7 has, for example, plural input keys that are operated by a user. The operation key 7 is to make key input of print setting information, for example, the number of print sheets, the number of print copies, color print or achromatic (black) print, and the like, in the printer unit 3. The operation key 7 is to make key input of copy setting information, for example, the umber of sheets to be copied, the number of copies to be copied, color copy or achromatic copy, and the like, in the scanner unit 4.

The liquid crystal display unit 6 displays the print setting information such as the number of print sheets, the number of print copies, and color print or achromatic (black) print, or the copy setting information such as the number of sheets to be copied, the number of copies to be copied, and color copy or achromatic copy, operated with the operation key 7. The liquid crystal display unit 6 displays, for example, the result of the number of print sheets printed by the printer unit 3, or for example, the result of the number of copies copied by the scanner unit 4.

The panel CPU 5 sends the print setting information or copy setting information inputted by the operation key 7, to the main control unit 1, and displays, for example, the result of the number of print sheets or the result of the number of copies received from the main control unit 1, onto the liquid crystal display unit 6.

The main control unit 1 has a main CPU 8. A ROM (read-only memory) 9, a RAM (random access memory) 10, a NVRAM (non-volatile random access memory) 11, a shared RAM 12, and a printer font ROM 13 are connected to the main CPU 8. A printer controller 14, an image processing device 15, and a page memory control unit 16 are connected to the main CPU 8. A page memory 17 is connected to the page memory control unit 16.

The ROM 9 stores a main control program or the like that controls each of the operation panel 2, the printer unit 3, and the scanner unit 4. The RAM 10 temporarily stores various data. The NVRAM 11 holds data even when power is shut down. A printer CPU 18 in the printer unit 3 is connected to the shared RAM 12. The shared RAM 12 is used to carry out bidirectional communication between the main CPU 8 and the printer CPU 18. The printer font ROM 13 stores font data corresponding to print data when the printer unit 3 prints the print data on a recording medium such as a recording sheet.

Figure 2:
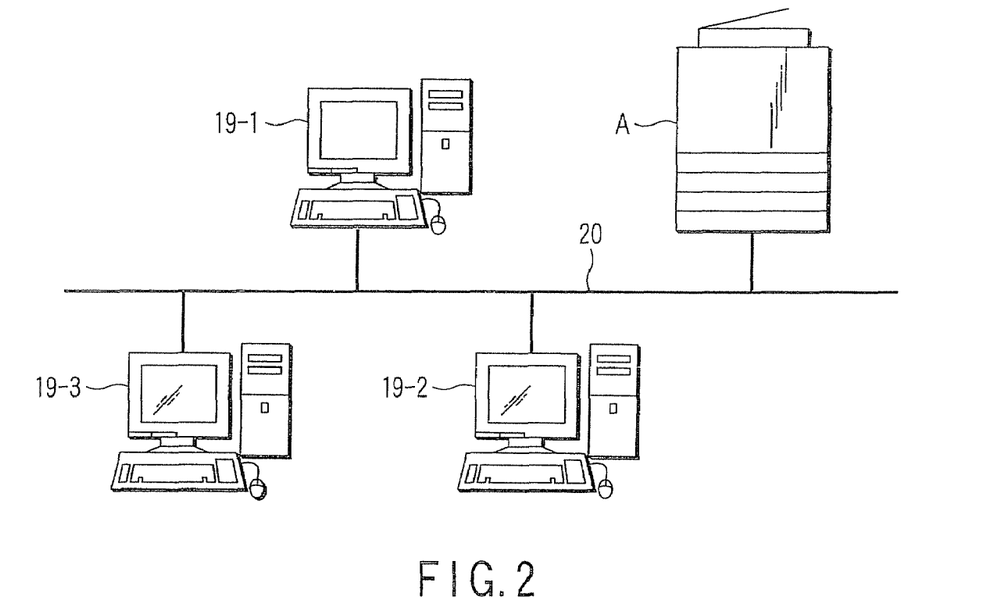
FIG. 2 is a view showing client computers connected to the apparatus.

An external device 19 is connected to the printer controller 14. The external device 19 may be, for example, plural client computers. FIG. 2 shows, for example, three client computers 19-1 to 19-3 connected to the apparatus A. The three client computers 19-1 to 19-3 are connected to the printer controller 14 via a network 20. Each of the client computers 19-1 to 19-3 sends print data to the printer controller 14 via the network 20. The print data is provided with resolution data.

The printer controller 14 develops the print data sent from the external device 19, for example, the client computers 19-1 to 19-3, into image data with the resolution corresponding to the resolution data provided for the print data and by using the font data stored in the printer font ROM 13.

The page memory control unit 16 writes and reads image data and the like to and from the page memory 17. The page memory 17 has an area to store image data of plural pages. In the page memory 17, for example, compressed data of the image data read by the scanner unit 4 can be written page by page.

The printer unit 3 has the printer CPU 18. A ROM 21 and a RAM 22 are connected to the printer CPU 18. A fixing control unit 23, a laser driver 24, a polygon motor driver 25, a carrying control unit 26, a process control unit 27, and an option control unit 28 are connected to the printer CPU 18. The ROM 21 stores a printer control program to control the printer unit 3, and so on. The RAM 22 temporarily stores various data.

The fixing control unit 23 controls a fixing device 29. The fixing device 29 fixes toner onto a recording medium at the time of the print operation. The laser driver 24 drives, for example, a semiconductor laser oscillator. The polygon motor driver 25 drives a polygon mirror of an exposure device. The polygon mirror scans the laser beam oscillated from the semiconductor laser oscillator. The carrying control unit 26 controls the carrying of a recording medium such as a recording sheet. The process control unit 27 controls a transfer process at the time of the print operation. The option control unit 28 controls an option operation in the print operation.

The printer unit 3 has the printer CPU 18 execute the printer control program, and issues control commands to the laser driver 24, the polygon motor driver 25, the carrying control unit 26, the process control unit 27, and the option control unit 28, respectively. The printer unit 3 causes the semiconductor laser oscillator to oscillate a laser beam, and scans the laser beam oscillated from the semiconductor laser oscillator by using the polygon mirror. The printer unit 3 causes toner to adhere to a drum in accordance with the print data, and transfers and fixes the toner on this drum onto a recording medium.

The scanner unit 4 has a scanner CPU 30. A ROM 31 and a RAM 32 are connected to the scanner CPU 30. An image correcting unit 33, a CCD (solid-state image sensor) driver 34, and a scanning motor driver 35 are connected to the scanner CPU 30. The ROM 31 stores a scanner control program to control the scanner unit 4, and so on. The RAM 32 temporarily stores various data.

The CCD driver 34 drives plural CCDs forming an image sensor. The image sensor is moved by a carriage. The scanning motor driver 35 controls the rotation of the scanning motor of the carriage. The image correcting unit 33 corrects a digital image signal acquired by image reading with the image sensor. Specifically, the image correcting unit 33 has an A/D converter circuit that converts an analog image signal outputted from the image sensor to a digital image signal, a shading correction circuit that performs shading correction of the digital image signal outputted from this A/D converter circuit, a line memory that temporarily stores the digital image signal that has been shading-corrected by this shading correction circuit, and so on.

The scanner unit 4 has the scanner CPU 30 execute the scanner control program, and issues control commands to the image correcting unit 33, the CCD driver 34, and the scanning motor driver 35, respectively. The scanner unit 4 moves the image sensor over a copy target and converts an analog image signal outputted from the image sensor to a digital image signal. The scanner unit 4 performs shading correction of this digital image signal and temporarily stores this shading-corrected digital image signal to the line memory.

The main CPU 8 and the printer CPU 18 are connected with each other via the shared RAM 12. The main CPU 8 and the printer CPU 18 carry out bidirectional communications via the shared RAM 12. The main CPU 8 sends an operation instruction to the printer CPU 18 via the shared RAM 12. The printer CPU 18 sends a status signal back to the main CPU 8 via the shared RAM 12.

The printer CPU 18 and the scanner CPU 30 carry out serial communications with each other. The printer CPU 18 sends an operation instruction to the scanner CPU 30. The scanner CPU 30 sends a status signal back to the printer CPU 18.

The shared RAM 12, the printer controller 14, the image processing device 15, the page memory 17, the laser driver 24, and the image correcting unit 33 are connected with each other via an image data bus 36.

In the ROM 9 of the main control unit 1, a job end time prediction program is stored. In the case where the printer unit 3 executes a print job to print print data onto a recording medium, the scanner unit 4 executes a copy job to copy a copy target, and higher priority is set for the copy job processing over the print job processing, when there is an interruption by copy job processing during the print job processing, the job end time prediction program predicts the end time of the print job on the basis of the copy job processing time required for the copy job processing.

The job end time prediction program multiplies the required copy time required per sheet of the copy target, the number of copies to be copied of the copy target and the number of sheets to be copied of the copy target, thus calculates the copy job processing time, and predicts the end time of the print job processing on the basis of this copy job processing time.

The job end time prediction program temporarily stops the print job processing by the printer unit 3 when there is an interruption by copy job processing by the scanner unit 4.

The job end time prediction program sends the predicted end time of the print job processing to one of the client computers 19-1 to 19-3, for example, to the client computer 19-1, via the network 20, and causes the predicted end time of the print job processing to be displayed on the monitor of the client computer 19-1.

The job end time prediction program selects each required copy time required per sheet of each copy target with respect to full-color or achromatic copy, and predicts the end time of the print job processing by using the required copy time per sheet of the full-color or achromatic copy target.

Figure 3:
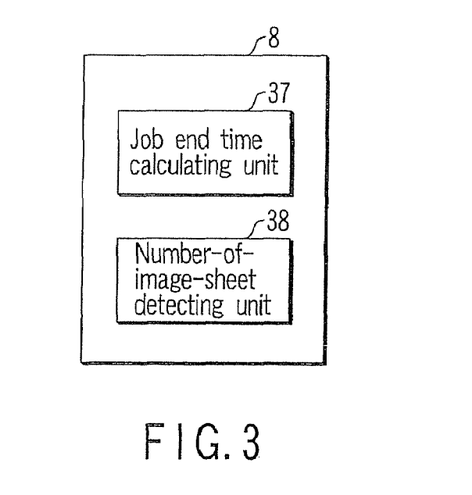
FIG. 3 is a functional block diagram of a main CPU in the apparatus.

The main CPU 8 executes the job end time prediction program stored in the ROM 9, thereby having a job end time calculating unit 37 and a number-of-image-sheet detecting unit 38, shown in FIG. 3. The job end time calculating unit 37 predicts the end time of the print job on the basis of the copy job processing time required for the copy job processing when there is an interruption by copy job processing during the print job processing in the case where the printer unit 3 executes the print job to print print data to a recording medium, the scanner unit 4 executes the copy job to copy the copy target, and higher priority is set for the copy job processing over the print job processing. The main CPU 8 has recognized that higher priority is set for the copy job processing by the scanner unit 4 over the print job processing by the printer unit 3.

The job end time calculating unit 37 multiplies the required copy time required per sheet of a copy target, the number of copies to be copied of the copy target and the number of sheets to be copied of the copy target, thus calculates the copy job processing time, then adds the print job processing time for the number of remaining sheets to this copy job processing time, and predicts the ultimate end time of the print job processing.

Copy job processing time=required copy time×number of copies to be copied×number of sheets to be copied (1)

Ultimate end time of print job processing=copy job processing time+print job processing time for number of remaining sheets (2)

In this case, the job end time calculating unit 37 selects each required copy time required per sheet of each copy target with respect to full-color or achromatic copy, and predicts the end time of the print job processing by using the required copy time per sheet of the full-color or achromatic copy target.

The job end time calculating unit 37 temporarily stops the print job processing by the printer unit 3 when there is an interruption by the copy job processing by the scanner unit 4.

The job end time calculating unit 37 sends the predicted end time of the print job processing to one of the client computers 19-1 to 19-3, for example, to the client computer 19-1, via the network 20, and causes the predicted end time of the print job processing to be displayed on the monitor of the client computer 19-1.

The number-of-image-sheet detecting unit 38 reads the number of sheets of the copy image data stored in the page memory 17 and sends it to the job end time calculating unit 37.

Next, the operation of predicting the end time of the print job processing in the case of an interruption by a copy job will be described.

For example, the client computer 19-1 sends print data and print job information including the number of copies to be printed of the print data and so on, to the main control unit 1 of the apparatus A via the network 20. The print data is provided with resolution data.

The printer controller 14 in the main control unit 1 develops the print data sent from the client computer 19-1, into image data with the resolution corresponding to the resolution data provided for the print data and by using the font data stored in the printer font ROM 13. The printer controller 14 sends the image data to the laser driver 24 of the printer unit 3 via the image data bus 36. The printer controller 14 sends the number of copies to be printed to the printer CPU 18 via the shared RAM 12.

The printer unit 3 has the printer CPU 18 execute the printer control program, drives the laser driver 24 in accordance with the image data, and issues control commands to the polygon motor driver 25, the carrying control unit 26, the process control unit 27, and the option control unit 28. Thus, the semiconductor laser oscillator oscillates a laser beam in accordance with the image data. The polygon mirror scans the laser beam oscillated from the semiconductor laser oscillator. Consequently, toner adheres to the drum in accordance with the print data. The toner on this drum is transferred to a recording medium and fixed thereon. The print data is recorded onto the recording medium. The printer unit 3 carries out print job processing for the number of times that corresponds to the number of copies to be printed multiplied by the number of sheets to be printed. Meanwhile, the printer CPU 18 measures the required print time required per sheet of the recording medium.

The client computer 19-1 sends a transmission request signal for the predicted end time of the print job to the main control unit 1 of the apparatus A via the network 20. The client computer 19-1 constantly requests transmission of the predicted end time of the print job. The main CPU 8 of the main control unit 1 executes processing according to the flowchart of calculation of the predicted print job end time shown in FIG. 4, and predicts the end time of the print job. That is, in step S1, the job end time calculating unit 37 receives the transmission request signal for the predicted end time of the print job sent from the client computer 19-1.

Figure 4:
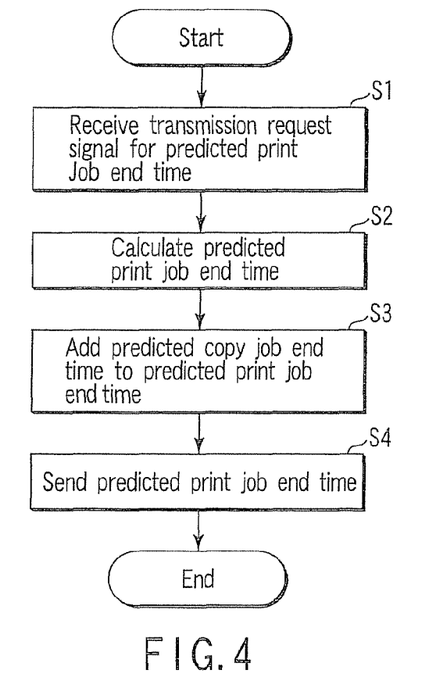
FIG. 4 is a flowchart of calculation of predicted print job end time.

Next, in step S2, the job end time calculating unit 37, triggered by the transmission request signal for the predicted end time of the print job, predicts the time when printing of all the print data that is currently held will end. That is, the job end time calculating unit 37 multiplies the required print time required per sheet to be printed, the number of copies to be copied, and the number of sheets of all the print data that is currently held, and thus predicts the end time of the print job processing. As the required print time required per sheet to be printed, for example, the time required per sheet in the print job that was executed most recently, may be used. Alternatively, as the required print time required per sheet to be printed, the time required per sheet of a document having an average volume of data may be used.

Next, in step S3, the job end time calculating unit 37 adds the predicted end time of the copy job, but no copy job is carried out here. Therefore, the main CPU 8 shifts to step S4 and sends the end time of the print job processing predicted in step S2 to the client computer 19-1 via the network 20. The client computer 19-1 displays the predicted end time of the print job processing on the monitor.

A case where there is an interruption by a copy job during a print job will now be described.

The user operates the operation key 7 to input the number of copies to be copied and so on. When a copy button of the operation key 7 is pressed by the user, the panel CPU 5 sends a copy start signal, and the number of copies to be copied and so on, inputted from the operation key 7, to the main CPU 8.

The main CPU 8 sends the copy start signal and the number of copies to be copied to the printer CPU 18 via the shared RAM 12. As it receives the copy start signal, the printer CPU 18 issues a print job pause command to each of the laser driver 24, the polygon motor driver 25, the carrying control unit 26, the process control unit 27, and the option control unit 28. Thus, the printer unit 3 temporarily stops the print job processing of the print data.

Along with this, the printer CPU 18 sends the copy start signal to the scanner CPU 30. The scanner unit 4 has the scanner CPU 30 execute the scanner control program, and issues control commands to the image correcting unit 33, the CCD driver 34, and the scanning motor driver 35, respectively. Thus, the image sensor moves with respect to the copy target as it is driven by the scanning motor driver 35. The image sensor reads the copy target and outputs an analog image signal. The image correcting unit 33 corrects a digital image signal acquired by the image reading with the image sensor. That is, the A/D converter circuit in the image correcting unit 33 converts the analog image signal outputted from the image sensor to a digital image signal. The shading correction circuit carries out shading correction of the digital image signal outputted from the A/D converter circuit. Thus, the image correcting unit 33 stores the shading-corrected digital image signal into the temporary line memory or the like.

The shading-corrected digital image signal is stored as copy image data into the page memory 17 via the image data bus 36 from the line memory or the like. The page memory 17 stores copy image data of plural pages. The page memory control unit 16 reads out the copy image data written in the page memory 17 and sends it to the laser driver 24 of the printer unit 3 via the image data bus 36.

The printer unit 3 has the printer CPU 18 execute the printer control program, drives the laser driver 24 in accordance with the copy image data, and issues control commands to the polygon motor driver 25, the carrying control unit 26, the process control unit 27, and the option control unit 28, respectively. Thus, the semiconductor laser oscillator oscillates a laser beam in accordance with the copy image data. The polygon mirror scans the laser beam oscillated from the semiconductor laser oscillator. Consequently, toner adheres to the drum in accordance with the copy image data. The toner on this drum is transferred to a recording medium and fixed thereto. The copy image data is copied onto the recording medium. The printer unit 3 carries out the copy job processing for the number of times that corresponds to the number of copies to be copied multiplied by the number of sheets to be copied.

The client computer 19-1 sends a transmission request signal for the predicted end time of the print job to the main control unit 1 of the apparatus A via the network 20. The client computer 19-1 constantly requests transmission of the predicted end time of the print job. The main CPU 8 of the main control unit 1 executes processing according to the flowchart of calculation of the predicted print job end time shown in FIG. 4, and predicts the end time of the print job. That is, in step S1, the job end time calculating unit 37 receives the transmission request signal for the predicted end time of the print job sent from the client computer 19-1.

Next, in step S2, the job end time calculating unit 37, triggered by the transmission request signal for the predicted end time of the print job, predicts the time when printing of all the print data that is currently held will end. That is, the job end time calculating unit 37 multiplies the required print time required per sheet to be printed, the number of copies to be copied, and the number of sheets of all the print data that is currently held, and thus predicts the end time of the print job processing. As the required print time required per sheet to be printed, for example, the time required per sheet in the print job that was executed most recently, may be used. Alternatively, as the required print time required per sheet to be printed, the time required per sheet of a document having an average volume of data may be used.

Figure 5:
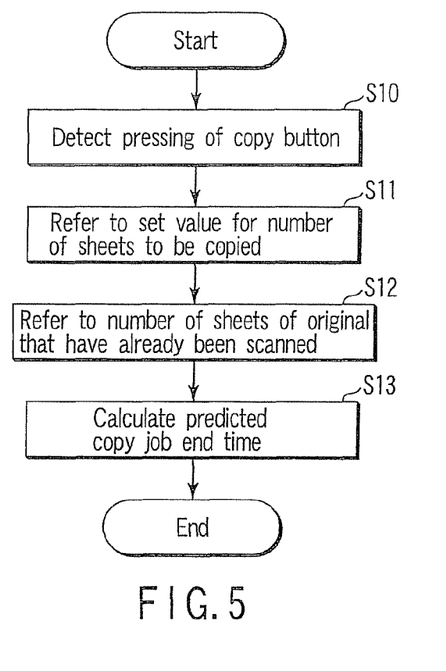
FIG. 5 is a flowchart of calculation of predicted copy job end time.

Next, in step S3, the job end time calculating unit 37 executes processing according to the flowchart of calculation of the predicted copy job end time shown in FIG. 5, and calculates the predicted end time of the copy job. That is, if the job end time calculating unit 37 detects in step S10 that the copy button on the operation panel 2 is pressed, the job end time calculating unit 37 in step S11 reads out the number of copies to be copied, read from the operation panel 2.

Next, in step S12, the number-of-image-sheet detecting unit 38 reads the number of sheets of the copy image data stored in the page memory 17, that is, the number of remaining sheets of the copy image data. The number-of-image-sheet detecting unit 38 sends the number of remaining sheets of the copy image data to the job end time calculating unit 37. The number of sheets of the copy image data stored in the page memory 17 is constantly reduced every time copying is made to a recording medium by the printer unit 3. Therefore, the number of sheets of the copy image data represents the number of remaining sheets to be copied, in real time.

Next, in step S13, the job end time calculating unit 37 receives the number of sheets of the copy image data from the number-of-image-sheet detecting unit 38. The job end time calculating unit 37 multiplies the number of copies to be copied, the number of remaining sheets of the copy image data, and the required copy time required per sheet of the copy target, in accordance with the equation (1), and calculates the copy job processing time. In this case, the job end time calculating unit 37 selects each required copy time required per sheet of each copy target with respect to full-color or achromatic copying, and predicts the copy job processing time by using the required copy time per sheet of the full-color or achromatic copy target.

Next, the job end time calculating unit 37 adds the copy job processing time to the end time of the print job processing that is previously predicted in accordance with the equation (2), and predicts the ultimate end time of the print job processing. The ultimate end time of the print job processing is the ultimate end time of carrying out interruption processing by a copy job, ending the copy job, and resuming the print job processing.

Figure 6:
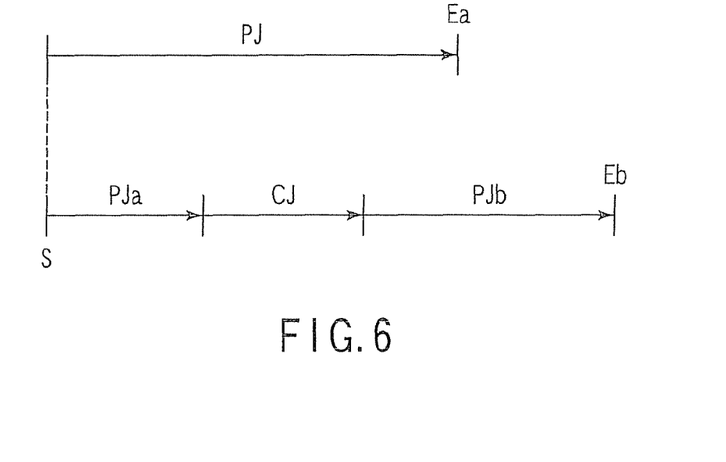
FIG. 6 is a view showing a predicted print job processing end time in the case where there is an interruption by a copy job during a print job processing.

For example, a print job PJ starts at time S as shown in FIG. 6. Unless there is an interruption by a copy job CJ, the print job PJ will end at time Ea.

On the other hand, there is an interruption by a copy job CJ during the execution of the print job PJ. The print job PJ before the interruption by the copy job CJ is assumed to be a print job PJa. The print job PJa temporarily stops at the interruption by the copy job CJ.

When the print job PJa is stopped, the copy job CJ starts. The job end time calculating unit 37 predicts the copy job processing time required for the copy job CJ. The job end time calculating unit 37 multiplies the required print time required per sheet to be printed, the number of copies to be copied, and the number of sheets of all the print data that is currently held, and predicts the processing time required for a print job PJb. The job end time calculating unit 37 adds the copy job processing time required for the copy job CJ to the processing time required for the print job PJb, and predicts the ultimate end time Eb of the print job PJb.

The number of sheets of the copy image data is constantly reduced every time printing is made to a recording medium by the printer unit 3. The job end time calculating unit 37 reads the number of sheets of the copy image data, which is constantly reduced every time printing is made to a recording medium by the printer unit 3. Therefore, the job end time calculating unit 37 predicts the ultimate end time of the print job processing corresponding to the number of processed sheets in the copy job, in real time.

Next, in step S4, the main CPU 8 sends the predicted ultimate end time of the print job processing to the client computer 19-1 via the network 20. The client computer 19-1 displays the predicted ultimate end time of the print job processing on the monitor. The ultimate end time of the print job processing, displayed on the monitor, is constantly updated to the latest end time.

When the interruption by the copy job is finished, the scanner CPU 30 sends a copy job end signal to the printer CPU 18. The printer unit 3 resumes the print job.

In this manner, according to the first embodiment, when there is an interruption by a copy job during the execution of a print job, the copy job processing time required for the copy job is predicted and this copy job processing time is added to the processing time required for the print job, and the ultimate end time of the print job is predicted. Thus, when there is an interruption by a copy job during the execution of a print job, the ultimate end time of the print job can be found. The ultimate end time of the print job is not the end time of the print job that is initially predicted at the start of the print job, but it is the time of ending the interruption processing by the copy job, then resuming the print job and ending the print job.

During the interruption by the copy job, the number of remaining sheets in the copy job is constantly reduced as the processing of the copy job progresses. The ultimate end time of the print job is found as required, by using the constantly decreasing number of remaining sheets in the copy job. Therefore, if the transmission request signal for the predicted end time of the print job sent from the client computer 19-1 is sent every predetermined period, the ultimate end time of the print job can be constantly updated every predetermined period and displayed on the monitor of the client computer 19-1 in real time.

Full-color and achromatic copy targets have a difference in the required copy time required per sheet of the copy target. The required copy time required per sheet of the copy target is selected in accordance with the full-color or achromatic copy target. Thus, the ultimate end time of the print job can be accurately predicted in accordance with the full-color or achromatic copy target.

The number of copies to be copied is read from the operation panel 2. The number of sheets of copy image data is read from the copy image data stored in the page memory 17. Thus, accurate values can be used for the number of copies to be copied and the number of sheets of the copy image data. Therefore, the ultimate end time of the print job can be predicted accurately and with high reliability.

Consequently, even when there is an interruption by a copy job during the execution of a print job and the copy job has a large number of sheets, the ultimate end time of the print job can be constantly updated every predetermined period and displayed in real time.

Next, a second embodiment of the invention will be described with reference to the drawings. The same parts as in FIG. 1 and FIG. 3 are denoted by the same reference numerals and will not be described further in detail.

Figure 7:
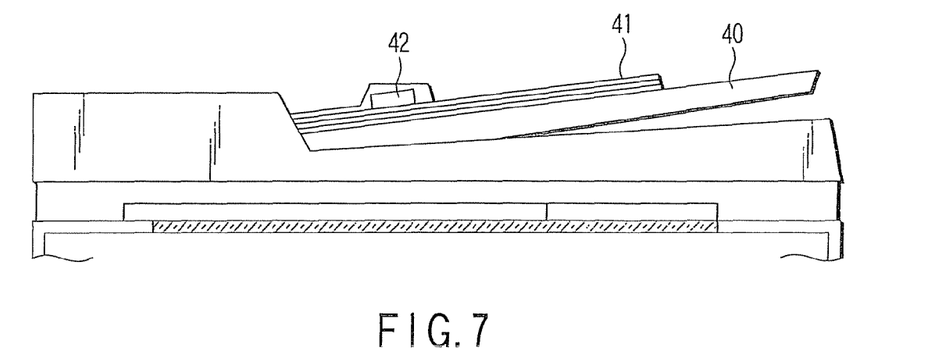
FIG. 7 is a configuration view of a feeder applied to a second embodiment of a digital multiple apparatus according to the invention.

FIG. 7 shows a configuration view of a feeder that is applied to the digital multiple apparatus A. A copy target 41 including plural sheets is set on a feeder 40. These sheets of copy target 41 are carried, for example, one by one, and copy job processing is carried out. A height detecting unit 42 is provided on the feeder 40. The height detecting unit 42 detects the height of the plural sheets of the copy target 41 stacked on the feeder 40, and outputs height information. The height of the respective sheets of the copy target 41 detected by the height detecting unit 42 is the height in the same direction as the direction in which the plural sheets of the copy target 41 are stacked.

The job end time calculating unit 37 receives the height information outputted from the height detecting unit 42 and converts this height information into the number of sheets of the copy target 41. The thickness per sheet of the copy target 41 is already known. The thickness per sheet of the copy target 41 varies depending on the sheet type, for example, plain paper, cardboard or the like. Therefore, if the sheet type of the copy target 41 is designated, for example, by the operation key 7 on the operation panel 2, the job end time calculating unit 37 can convert the height information into the number of sheets of the copy target 41.

The job end time calculating unit 37 multiplies the number of sheets of the copy target 41, the required copy time required per sheet of the copy target 41, and the number of copies to be copied of the copy target 41, and thus calculates the end time of the print job processing.

Next, the operation of predicting the end time of print job processing when there is an interruption by a copy job, will be described.

The copy target 41 including plural sheets is set on the feeder 40.

As the job end time calculating unit 37 detects in step S10 that the copy button on the operation panel 2 is pressed, the job end time calculating unit 37 in the next step S11 reads out the number of copies to be copied, which is read from the operation panel 2.

Meanwhile, the height detecting unit 42 detects the height of the copy target 41 of plural sheets stacked on the feeder 40, and outputs height information. The height of the copy target 41 of plural sheets stacked on the feeder 40 is constantly reduced every time a copy job is made for one sheet by the scanner unit 4. Therefore, the height information of the copy target 41 of plural sheets represents the number of remaining sheets to be copied, in real time.

Next, in step S13, the job end time calculating unit 37 receives the height information outputted from the height detecting unit 42 and converts this height information into the number of remaining sheets of the copy target 41.

Next, the job end time calculating unit 37 multiplies the number of copies to be copied, the number of remaining sheets of the copy image data, and the required copy time required per sheet of the copy target, in accordance with the equation (1), and calculates the copy job processing time. In this case, the job end time calculating unit 37 selects each required copy time required per sheet of each copy target with respect to full-color or achromatic copying, and predicts the copy job processing time by using the required copy time per sheet of the full-color or achromatic copy target.

Next, the job end time calculating unit 37 adds the copy job processing time to the end time of the print job processing that is previously predicted in accordance with the equation (2), and predicts the ultimate end time of the print job processing.

In this manner, according to the second embodiment, when there is an interruption by a copy job during the execution of a print job, the height of the copy target 41 of plural sheets stacked on the feeder 40 is converted to the number of remaining sheets of the copy target 41. The copy job processing time required for the copy job is predicted by using this number of remaining sheets. This copy job processing time is added to the processing time required for the print job, and the ultimate end time of the print job is predicted. Thus, the second embodiment has effects and advantages similar to those of the first embodiment.

Next, a third embodiment of the invention will be described with reference to the drawings. The same parts as in FIG. 1, FIG. 3 and FIG. 7 are denoted by the same reference numerals and will not be described further in detail.

This embodiment is a combination of the first and second embodiments. That is, the copy target 41 of plural sheets is set on the feeder 40. The height detecting unit 42 detects the height of the copy target 41 of plural sheets stacked on the feeder 40, and outputs height information.

Next, in step S13, the job end time calculating unit 37 receives the height information outputted from the height detecting unit 42 and converts this height information into the number of remaining sheets of the copy target 41.

The job end time calculating unit 37 multiplies the number of copies to be copied, the number of remaining sheets of the copy image data, and the required copy time required per sheet of the copy target, in accordance with the equation (1), and calculates the copy job processing time. The job end time calculating unit 37 adds the copy job processing time to the end time of the print job processing that is previously predicted in accordance with the equation (2), and predicts the ultimate end time of the print job processing. Thus, it is possible to predict the ultimate end time of the print job processing before starting the copy job.

After that, as the copy job is started, each copy image data of the copy target 41 of plural sheets is stored into the page memory 17. The number-of-image-sheet detecting unit 38 in step S12 reads the number of sheets of the copy image data stored in the page memory 17, that is, the number of remaining sheets of the copy image data. The job end time calculating unit 37 multiplies the number of copies to be copied, the number of remaining sheets of the copy image data, and the required copy time required per sheet of the copy target, in accordance with the equation (1), and calculates the copy job processing time. The job end time calculating unit 37 adds the copy job processing time to the end time of the print job processing that is previously predicted in accordance with the equation (2), and predicts the ultimate end time of the print job processing.

In this manner, according to the third embodiment, before the copy job is started, the ultimate end time of the print job processing is predicted on the basis of the height information of the copy target 41 of plural sheets set on the feeder 40, and when the copy job is started, the ultimate end time of the print job processing is predicted on the basis of the number of remaining sheets of the copy image data stored in the page memory 17. If the number of remaining sheets of the copy target 41 converted from the height information of the copy target 41 is compared with the number of remaining sheets of the copy image data stored in the page memory 17, the number of remaining sheets of the copy image data stored in the page memory 17 represents a more accurate number of sheets than the number of remaining sheets of the copy target 41 converted from the height information of the copy target 41.

Therefore, before the copy job is started, the approximate ultimate end time of the print job processing can be predicted very quickly. The approximate end time of the print job processing can be used as a measure of the end of the print job processing. When the copy job is started, the accurate ultimate end time of the print job processing can be predicted.

Next, a modification will be described.

The above embodiments include the printer unit 3 and the scanner unit 4, but a facsimile function may be provided. The facsimile may receive urgent data. The facsimile has the function of receiving urgent data and detecting this data. The priority given to the facsimile at the time of receiving urgent data is set to be higher than the priority of, for example, one or both of the printer unit 3 and the scanner unit 4.

For example, the priority given to the facsimile when receiving urgent data is set to be higher than the priority of the printer unit 3. In this case, when urgent facsimile data is received during the execution of a print job and there is an interruption by a copy job, the processing time for receiving and printing of the facsimile data, required for the facsimile data, is predicted. This processing time is added to the processing time required for the print job, and the ultimate end time of the print job is predicted.

The copy job may include copying both side of the copy target 41. In the case of copying both sides of the copy target 41, the copy job processing time must include the processing time that is twice the time of copying at least one side of one sheet of the copy target 41, and the time of reversing the copy target 41. Therefore, the copy job processing time is calculated by adding the processing time that is twice the time of copying at least one side of one sheet of the copy target 41 and the time of reversing the copy target 41, and multiplying the added time, the number of copies to be copied, and the number of remaining sheets of the copy image data.

The ultimate end time of the print job is displayed, for example, on the monitor of the client computer 19-1. However, it is not limited to this and the ultimate end time may be displayed, for example, on the liquid crystal display unit 6 of the operation panel 2.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A digital multiple apparatus comprising:
   at least two job processing units configured to process a print job and a copy job;
   an image reading unit configured to read plural sheets of a copy target and output each of them as respective image data;
   an image memory configured to store the respective image data outputted from the image reading unit;
   a number-of-image sheet detecting unit configured to detect the number of images of the respective image data stored in the image memory; and
   a job end time calculating unit configured, while the print job processing by one job processing unit of the at least two job processing units, if there is an interruption by the copy job processing by the other job processing unit, to calculate the end time of the print job processing on the basis of the number of image sheets detected by the number-of-image-sheet detecting unit.

2. The digital multiple apparatus according to claim 1, wherein if there is an interruption by the copy job processing by the other job processing unit, the one job processing unit temporarily stops the print job processing.

3. The digital multiple apparatus according to claim 1, wherein, for the other job processing unit that processes the copy job, higher priority is set over the one job processing unit that processes the print job, and
   during the processing of the print job by the one job processing unit, if there is an interruption by the copy job processing by the other job processing unit, the job end time calculating unit calculates the end time of the print job by the one job processing unit on the basis of copy job processing time required for the copy job processing.

4. The digital multiple apparatus according to claim 3, wherein the job end time calculating unit calculates the copy job processing time on the basis of at least the required copy time required per unit number of sheets and the number of sheets in the copy job processing, and predicts the end time of the print job processing on the basis of the copy job processing time.

5. The digital multiple apparatus according to claim 4, wherein, in the job end time calculating unit, each of the required copy time required per sheet of each of the copy target is set with respect to full-color and achromatic copying, and the job end time calculating unit uses the required copy time per sheet of the copy target in accordance with the print data of the full-color or the achromatic copying.

6. The digital multiple apparatus according to claim 3, wherein the job end time calculating unit multiplies the required copy time required per sheet of the copy target, the number of copies to be copied of the copy target, and the number of sheets to be copied of the copy target, thus calculates the copy job processing time, then adds the time required for the remaining print job processing to the copy job processing time, and calculates the ultimate end time of the print job processing.

7. The digital multiple apparatus according to claim 1, wherein the job end time calculating unit multiplies the required copy time required per sheet of the copy target, the number of copies to be copied of the copy target, and the number of image sheets, and thus calculates the end time of the print job processing.

8. The digital multiple apparatus according to claim 1, comprising:
    at least one computer connected thereto via a network; and
    a monitor provided in the computer;
    wherein the job end time calculating unit sends the end time of the print job processing to the computer via the network, and
    the computer displays the end time of the job processing on the monitor.

9. A job end time prediction method for a digital multiple apparatus comprising:
    processing at least two jobs of a print job and a copy job;
    reading plural sheets of a copy target and outputting each of them as respective image data;
    detecting the number of images of the respective image data; and
    while the print job processing which is one job processing of the at least two job processes, if there is an interruption by the copy job processing which is the other job processing, calculating the end time of the print job processing on the basis of the number of image sheets.

10. The job end time prediction method for a digital multiple apparatus according to claim 9, wherein if there is an interruption by the copy job processing by the other job processing unit, the job processing by the one job processing unit temporarily stops.

11. The job end time prediction method for a digital multiple apparatus according to claim 9, wherein, for the processing of the copy job, higher priority is set over the processing of the print job, and
    during the processing of the print job, if there is an interruption by the copy job processing, the job end time calculating unit predicts the end time of the print job on the basis of copy job processing time required for the copy job processing.

12. The job end time prediction method for a digital multiple apparatus according to claim 11, wherein the copy job processing time is calculated on the basis of at least the required copy time required per unit number of sheets and the number of sheets in the copy job processing, and the end time of the print job processing is calculated on the basis of the copy job processing time.

13. The job end time prediction method for a digital multiple apparatus according to claim 12, wherein each of the required copy time required per sheet of each of the copy target is set with respect to full-color and achromatic copying, and the required copy time per sheet of the copy target is used in accordance with the print data of the full-color or the achromatic copying.

14. The job end time prediction method for a digital multiple apparatus according to claim 11, wherein the required copy time required per sheet of the copy target, the number of copies to be copied of the copy target, and the number of sheets to be copied of the copy target are multiplied to calculate the copy job processing time, and the time required for the remaining print job processing is added to the copy job processing time, thus the ultimate end time of the print job processing is calculated.

15. The job end time prediction method for a digital multiple apparatus according to claim 9, wherein the required copy time required per sheet of the copy target, the number of copies to be copied of the copy target, and the number of image sheets are multiplied to calculate the end time of the print job processing.

16. The job end time prediction method for a digital multiple apparatus according to claim 9,
    wherein the end time of the print job processing is sent to a computer via the network, and
    the end time of the print job processing is displayed on the monitor by the computer.

17. A non transitory computer-readable medium storing a job end time prediction program for a digital multiple apparatus comprising:
    processing at least two jobs of a print job and a copy job;
    reading plural sheets of a copy target and outputting each of them as respective image data;
    detecting the number of images of the respective image data; and
    while the print job processing which is one job processing of the at least two job processes, if there is an interruption by the copy job processing which is the other job processing, calculating the end time of the print job processing on the basis of the number of image sheets.

18. The storage medium storing a job end time prediction program for a digital multiple apparatus according to claim 17, wherein if there is an interruption by the copy job processing by the other job processing unit, the print job processing by the one job processing unit temporarily stops.

19. The storage medium storing a job end time prediction program for a digital multiple apparatus according to claim 17, wherein, for the processing of the copy job, higher priority is set over the processing of the print job, and
    during the processing of the print job, if there is an interruption by the copy job processing, the end time of the print job is predicted on the basis of copy job processing time required for the copy job processing.

20. The storage medium storing a job end time prediction program for a digital multiple apparatus according to claim 17, wherein the required copy time required per sheet of the copy target, the number of copies to be copied of the copy target, and the number of image sheets are multiplied to calculate the end time of the print job processing.

* * * * *